United States Patent
Bradshaw et al.

(10) Patent No.: US 10,216,728 B2
(45) Date of Patent: *Feb. 26, 2019

(54) METHOD AND APPARATUS FOR AGGREGATING WITH INFORMATION GENERALIZATION

(71) Applicant: ARRIA DATA2TEXT LIMITED, Aberdeen (GB)

(72) Inventors: William Anthony Bradshaw, Aberdeen (GB); Ehud Baruch Reiter, Aberdeen (GB)

(73) Assignee: ARRIA DATA2TEXT LIMITED, Aberdeen (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/421,925

(22) Filed: Feb. 1, 2017

(65) Prior Publication Data

US 2017/0364511 A1    Dec. 21, 2017

Related U.S. Application Data

(63) Continuation of application No. 14/702,325, filed on May 1, 2015, now Pat. No. 9,600,471, which is a (Continued)

(51) Int. Cl.
*G06F 17/28* (2006.01)
*G06F 17/27* (2006.01)

(52) U.S. Cl.
CPC ...... *G06F 17/2881* (2013.01); *G06F 17/2705* (2013.01); *G06F 17/2775* (2013.01); *G06F 17/28* (2013.01)

(58) Field of Classification Search
None
See application file for complete search history.

(56) References Cited

U.S. PATENT DOCUMENTS

| 5,181,250 A | 1/1993 | Morgan et al. |
| 5,237,502 A | 8/1993 | White et al. |

(Continued)

FOREIGN PATENT DOCUMENTS

| AU | 2011247830 B2 | 12/2011 |
| AU | 2011253627 B2 | 12/2011 |

(Continued)

OTHER PUBLICATIONS

Dalianis, H. et al Aggregation in Nature Language Generation, Trends in Natural Language Generation An Artificial Intelligence Perspective, Springer Berlin Heidelberg, Berlin (Apr. 28, 1993) pp. 88-105.*

(Continued)

*Primary Examiner* — Douglas Godbold
(74) *Attorney, Agent, or Firm* — Alston & Bird LLP (57) ABSTRACT

Methods, apparatuses, and computer program products are described herein that are configured to perform aggregation of phrase specifications. In some example embodiments, a method is provided that comprises identifying two or more generalized phrase specifications. In some example embodiments, the two or more generalized phrase specifications contain at least one aggregatable constituent. The method of this embodiment may also include generating an aggregated phrase specification from the two or more generalized phrase specifications. In some example embodiments, the aggregated phrase specification comprises a combined noun phrase generated from the aggregatable constituents and one or more additional constituents based on a determined level of generalization.

30 Claims, 5 Drawing Sheets

Related U.S. Application Data continuation of application No. PCT/US2012/063343, filed on Nov. 2, 2012.

(56) References Cited

U.S. PATENT DOCUMENTS

| | | | |
|---|---|---|---|
| 5,311,429 A | 5/1994 | Tominaga | |
| 5,321,608 A | 6/1994 | Namba et al. | |
| 5,629,687 A | 5/1997 | Sutton et al. | |
| 5,794,177 A | 8/1998 | Carus et al. | |
| 5,802,488 A | 9/1998 | Edatsune | |
| 6,023,669 A | 2/2000 | Suda et al. | |
| 6,078,914 A | 6/2000 | Redfern | |
| 6,138,087 A | 10/2000 | Budzinski | |
| 6,266,617 B1 | 7/2001 | Evans | |
| 6,442,485 B2 | 8/2002 | Evans | |
| 6,466,899 B1 | 10/2002 | Yano et al. | |
| 6,665,640 B1 | 12/2003 | Bennett et al. | |
| 6,717,513 B1 | 4/2004 | Shprecher et al. | |
| 6,947,885 B2 | 9/2005 | Bangalore et al. | |
| 7,043,420 B2 | 5/2006 | Ratnaparkhi | |
| 7,167,824 B2 | 1/2007 | Kallulli | |
| 7,231,341 B2 | 6/2007 | Bangalore et al. | |
| 7,238,313 B2 | 7/2007 | Ferencz et al. | |
| 7,305,336 B2 | 12/2007 | Polanyi et al. | |
| 7,310,969 B2 | 12/2007 | Dale | |
| 7,346,493 B2 | 3/2008 | Ringger et al. | |
| 7,418,447 B2 | 8/2008 | Caldwell et al. | |
| 7,424,363 B2 | 9/2008 | Cheng et al. | |
| 7,444,287 B2 | 10/2008 | Claudatos et al. | |
| 7,496,621 B2 | 2/2009 | Pan et al. | |
| 7,526,424 B2 | 4/2009 | Corston-Oliver et al. | |
| 7,533,089 B2 | 5/2009 | Pan et al. | |
| 7,562,005 B1 | 7/2009 | Bangalore et al. | |
| 7,684,991 B2 | 3/2010 | Stohr et al. | |
| 7,711,581 B2 | 5/2010 | Hood et al. | |
| 7,783,486 B2 | 8/2010 | Rosser et al. | |
| 7,809,552 B2 | 10/2010 | Pan et al. | |
| 7,849,048 B2 | 12/2010 | Langseth et al. | |
| 7,849,049 B2 | 12/2010 | Langseth et al. | |
| 7,856,390 B2 | 12/2010 | Schiller | |
| 7,873,509 B1 | 1/2011 | Budzinski | |
| 7,921,091 B2 | 4/2011 | Cox et al. | |
| 7,930,169 B2 | 4/2011 | Billerey-Mosier | |
| 7,933,774 B1 | 4/2011 | Begeja et al. | |
| 7,966,172 B2 | 6/2011 | Ruiz et al. | |
| 7,970,601 B2 | 6/2011 | Burmester et al. | |
| 7,979,267 B2 | 7/2011 | Ruiz et al. | |
| 8,019,610 B2 | 9/2011 | Walker et al. | |
| 8,024,331 B2 | 9/2011 | Calistri-Yeh et al. | |
| 8,037,000 B2 | 10/2011 | Delmonico et al. | |
| 8,082,144 B1 | 12/2011 | Brown et al. | |
| 8,090,727 B2 | 1/2012 | Lachtarnik et al. | |
| 8,150,676 B1 | 4/2012 | Kaeser | |
| 8,175,873 B2 | 5/2012 | Di Fabbrizio et al. | |
| 8,180,647 B2 | 5/2012 | Walker et al. | |
| 8,180,758 B2 | 5/2012 | Cornali | |
| 8,229,937 B2 | 7/2012 | Kiefer et al. | |
| 8,355,903 B1 | 1/2013 | Birnbaum et al. | |
| 8,374,848 B1 | 2/2013 | Birnbaum et al. | |
| 8,425,325 B2 | 4/2013 | Hope | |
| 8,473,911 B1 | 6/2013 | Baxter | |
| 8,494,944 B2 | 7/2013 | Schiller | |
| 8,515,733 B2 | 8/2013 | Jansen | |
| 8,515,737 B2 | 8/2013 | Allen | |
| 8,548,814 B2 | 10/2013 | Manuel-Devadoss | |
| 8,548,915 B2 | 10/2013 | Antebi et al. | |
| 8,561,014 B2 | 10/2013 | Mengusoglu et al. | |
| 8,566,090 B2 | 10/2013 | Di Fabbrizio et al. | |
| 8,589,148 B2 | 11/2013 | Atallah et al. | |
| 8,589,172 B2 | 11/2013 | Alonso et al. | |
| 8,616,896 B2 | 12/2013 | Lennox | |
| 8,620,669 B2 | 12/2013 | Walker et al. | |
| 8,626,613 B2 | 1/2014 | Dale et al. | |
| 8,630,844 B1 | 1/2014 | Nichols et al. | |
| 8,655,889 B2 | 2/2014 | Hua et al. | |
| 8,676,691 B2 | 3/2014 | Schiller | |
| 8,688,434 B1 | 4/2014 | Birnbaum et al. | |
| 8,700,396 B1 | 4/2014 | Mengibar et al. | |
| 8,738,384 B1 | 5/2014 | Bansal et al. | |
| 8,738,558 B2 | 5/2014 | Antebi et al. | |
| 8,762,134 B2 | 5/2014 | Reiter | |
| 8,762,133 B2 | 6/2014 | Reiter | |
| 8,775,161 B1 | 7/2014 | Nichols et al. | |
| 8,825,533 B2 | 9/2014 | Basson et al. | |
| 8,843,363 B2 | 9/2014 | Birnbaum et al. | |
| 8,849,670 B2 | 9/2014 | Di Cristo et al. | |
| 8,886,520 B1 | 11/2014 | Nichols et al. | |
| 8,892,417 B1 | 11/2014 | Nichols et al. | |
| 8,892,419 B2 | 11/2014 | Lundberg et al. | |
| 8,898,063 B1 | 11/2014 | Sykes et al. | |
| 8,903,711 B2 | 12/2014 | Lundberg et al. | |
| 8,903,718 B2 | 12/2014 | Akuwudike | |
| 8,909,595 B2 | 12/2014 | Gandy et al. | |
| 8,914,452 B2 | 12/2014 | Boston et al. | |
| 8,924,330 B2 | 12/2014 | Antebi et al. | |
| 8,930,305 B2 | 1/2015 | Namburu et al. | |
| 8,977,953 B1 | 3/2015 | Pierre et al. | |
| 8,984,051 B2 | 3/2015 | Olsen et al. | |
| 9,002,695 B2 | 4/2015 | Watanabe et al. | |
| 9,002,869 B2 | 4/2015 | Riezler et al. | |
| 9,015,730 B1 | 4/2015 | Allen et al. | |
| 9,028,260 B2 | 5/2015 | Nanjiani et al. | |
| 9,092,276 B2 | 7/2015 | Allen et al. | |
| 9,104,720 B2 | 8/2015 | Rakshit et al. | |
| 9,110,882 B2 | 8/2015 | Overell et al. | |
| 9,110,977 B1 | 8/2015 | Pierre et al. | |
| 9,111,534 B1 | 8/2015 | Sylvester et al. | |
| 9,135,244 B2 | 9/2015 | Reiter | |
| 9,135,662 B2 | 9/2015 | Evenhouse et al. | |
| 9,146,904 B2 | 9/2015 | Allen | |
| 9,164,982 B1 | 10/2015 | Kaeser | |
| 9,190,054 B1 | 11/2015 | Riley et al. | |
| 9,208,147 B1 | 12/2015 | Nichols et al. | |
| 9,229,927 B2 | 1/2016 | Wolfram et al. | |
| 9,240,197 B2 | 1/2016 | Begeja et al. | |
| 9,244,894 B1 | 1/2016 | Dale et al. | |
| 9,251,134 B2 | 2/2016 | Birnbaum et al. | |
| 9,251,143 B2 | 2/2016 | Bird et al. | |
| 9,263,039 B2 | 2/2016 | Di Cristo et al. | |
| 9,268,770 B1 | 2/2016 | Kursun | |
| 9,323,743 B2 | 4/2016 | Reiter | |
| 9,405,448 B2 | 8/2016 | Reiter | |
| 9,600,471 B2 * | 3/2017 | Bradshaw | G06F 17/28 |
| 9,640,045 B2 | 5/2017 | Reiter | |
| 9,990,360 B2 | 6/2018 | Sripada | |
| 10,026,274 B2 | 7/2018 | Reiter | |
| 2002/0026306 A1 | 2/2002 | Bangalore et al. | |
| 2003/0131315 A1 | 7/2003 | Escher | |
| 2003/0212545 A1 | 11/2003 | Kallulli | |
| 2004/0246120 A1 | 12/2004 | Benner et al. | |
| 2005/0039107 A1 | 2/2005 | Hander et al. | |
| 2005/0228635 A1 | 10/2005 | Araki et al. | |
| 2005/0256703 A1 | 11/2005 | Markel | |
| 2006/0085667 A1 | 4/2006 | Kubota et al. | |
| 2006/0178868 A1 | 8/2006 | Billerey-Mosier | |
| 2006/0259293 A1 | 11/2006 | Orwant | |
| 2007/0050180 A1 * | 3/2007 | Dori | G06F 17/289 703/6 |
| 2007/0078655 A1 | 4/2007 | Semkow et al. | |
| 2007/0106628 A1 | 5/2007 | Adjali et al. | |
| 2007/0129942 A1 | 6/2007 | Ban et al. | |
| 2007/0143099 A1 | 6/2007 | Balchandran et al. | |
| 2008/0221865 A1 | 9/2008 | Wellmann | |
| 2008/0221870 A1 | 9/2008 | Attardi et al. | |
| 2008/0281781 A1 | 11/2008 | Zhao et al. | |
| 2008/0312954 A1 | 12/2008 | Ullrich et al. | |
| 2009/0089100 A1 | 4/2009 | Nenov et al. | |
| 2009/0089126 A1 | 4/2009 | Odubiyi | |
| 2009/0111486 A1 | 4/2009 | Burstrom | |
| 2009/0156229 A1 | 6/2009 | Hein et al. | |
| 2009/0157380 A1 * | 6/2009 | Kim | G06F 17/2818 704/4 |
| 2009/0198496 A1 | 8/2009 | Denecke | |
| 2009/0281839 A1 | 11/2009 | Lynn et al. | |

(56) References Cited

U.S. PATENT DOCUMENTS

| | | |
|---|---|---|
| 2009/0286514 A1 | 11/2009 | Lichorowic et al. |
| 2009/0287567 A1 | 11/2009 | Penberthy et al. |
| 2010/0146491 A1 | 6/2010 | Hirano et al. |
| 2010/0153095 A1 | 6/2010 | Yang et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0332235 A1 | 12/2010 | David |
| 2011/0010164 A1 | 1/2011 | Williams |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2012/0078888 A1 | 3/2012 | Brown et al. |
| 2012/0084027 A1 | 4/2012 | Caine |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0290289 A1 | 11/2012 | Manera et al. |
| 2012/0310990 A1 | 12/2012 | Viegas et al. |
| 2013/0030810 A1 | 1/2013 | Kopparapu et al. |
| 2013/0066873 A1 | 3/2013 | Salvetti et al. |
| 2013/0144606 A1 | 6/2013 | Birnbaum et al. |
| 2013/0145242 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Byron et al. |
| 2015/0179082 A1 | 6/2015 | Byron et al. |
| 2015/0227508 A1 | 8/2015 | Howald et al. |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324347 A1* | 11/2015 | Bradshaw ............... G06F 17/28 704/9 |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0325000 A1 | 11/2015 | Sripada |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0356127 A1 | 12/2015 | Pierre et al. |
| 2015/0363363 A1 | 12/2015 | Bohra et al. |
| 2015/0363364 A1 | 12/2015 | Sripada |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0328385 A1 | 11/2016 | Reiter |
| 2017/0018107 A1 | 1/2017 | Reiter |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1336955 B1 | 5/2006 |
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 A | 1/2004 |
| JP | 2014165766 A | 9/2014 |
| WO | WO 2000/074394 A2 | 12/2000 |
| WO | WO 2002/031628 A2 | 4/2002 |
| WO | WO 2002/073449 A1 | 9/2002 |
| WO | WO 2002/073531 A1 | 9/2002 |
| WO | WO 2002/031628 A3 | 10/2002 |
| WO | WO 2006/010044 A2 | 1/2006 |
| WO | WO 2007/04121 A1 | 4/2007 |
| WO | WO 2009/014465 A2 | 1/2009 |
| WO | WO 2010/049925 A2 | 5/2010 |
| WO | WO 2010/051404 A1 | 5/2010 |
| WO | WO 2012/071571 A2 | 5/2012 |
| WO | WO 2013/009613 A1 | 1/2013 |
| WO | WO 2013/042115 A2 | 3/2013 |
| WO | WO 2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/159133 A1 | 10/2015 |

(56) References Cited

FOREIGN PATENT DOCUMENTS

| WO | WO 2015/164253 A1 | 10/2015 |
|---|---|---|
| WO | WO 2015/175338 A1 | 11/2015 |
| WO | WO 2016/004266 A2 | 1/2016 |

OTHER PUBLICATIONS

Office Action for U.S. Appl. No. 15/188,423 dated Jul. 20, 2018.
Alawneh et al., "Pattern Recognition Techniques Applied to the Abstraction of Traces of Inter-Process Communication," Software Maintenance and Reengineering (CSMR), 2011 15th European Conference on Year: 2011, IEEE Conference Publications, pp. 211-220, (2011).
Andre et al., "From Visual Data to Multimedia Presentations," Grounding Representations: Integration of Sensory Information in Natural Language Processing, Artificial Intelligence and Neural networks, IEE Colloquium on, pp. 1-3, (1995).
Andre et al., "Natural Language Access to Visual Data: Dealing with Space and Movement," Report 63, German Research Center for Artificial Intelligence (DFKI) SFB 314, Project VITRA, pp. 1-21, (1989).
Barzilay et al.; "Aggregation via Set Partitioning for Natural Language Generation", Proceedings of the Human Language Technology Conference of the North American Chapter of the ACL; pp. 359-366; (2006).
Bhoedjang et al., "Optimizing Distributed Data Structures Using Application-Specific Network Interface Software," Parallel Processing, Proceedings; International Conference on Year: 1998, IEEE Conference Publications, pp. 485-492, (1998).
Cappozzo et al., "Surface-Marker Cluster Design Criteria for 3-D Bone Movement Reconstruction," IEEE Transactions on Biomedical Engineering, 44(12):1165-1174, (1997).
Dragon et al., "Multi-Scale Clustering of Frame-to-Frame Correspondences for Motion Segmentation," Computer Vision ECCV, Springer Berlin Heidelberg, pp. 445-458, (2012).
Gatt et al.,"From Data to Text in the Neonatal Intensive Care Unit: Using NLG Technology for Decision Support and Information Management," AI Communication, pp. 153-186, (2009).
Gorelov et al., "Search Optimization in Semistructured Databases Using Hierarchy of Document Schemas," Programming and Computer Software, 31(6):321-331, (2005).
Herzog et al., "Combining Alternatives in the Multimedia Presentation of Decision Support Information for Real-Time Control," IFIP, 15 pages,(1998).
Kottke et al., "Motion Estimation Via Cluster Matching," 8180 IEEE Transactions on Pattern Analysis and Machine Intelligence, 16(11):1128-1132, (1994).
Kukich, "Knowledge-Based Report Generation: A Knowledge-Engineering Approach to Natural Language Report Generation," Dissertation to The Interdisciplinary Department of Information Science, University of Pittsburg, 260 pages, (1983).
Leonov et al., "Construction of an Optimal Relational Schema for Storing XML Documents in an RDBMS Without Using DTD/XML Schema," Programming and Computer Software, 30(6):323-336, (2004).
Perry et al., "Automatic Realignment of Data Structures to Improve MPI Performance," Networks (ICN), Ninth International Conference on Year: 2010, IEEE Conference Publications, pp. 42-47, (2010).
Quinlan, "Induction of Decision Trees," Machine Learning, Kluwer Academic Publishers, 1(1):81-106, (1986).
Radev et al.,"Generating Natural Language Summaries from Multiple On-Line Sources,"Association of Computational Linguistics, 24(3):469-500, (1998).
Reiter et al., "Building Applied Natural Language Generation Systems," Natural Language Engineering 1 (1), 31 pages, (1995).
Reiter et al.; "Studies in Natural Language Processing—Building Natural Language Generation Systems," Cambridge University Press, (2000).
Reiter, "An Architecture for Data-to-Text Systems," Proceedings of ENLG-2007, pp. 97-104, (2007).
Shaw, "Clause Aggregation Using Linguistic Knowledge;" Proceedings of IWNLG, pp. 138-147, (1998). Retrieved from <http://acl.ldc.upenn.edu/W/W98/W98-1415.pdf>.
Spillner et al., "Algorithms for Dispersed Processing," Utility and Cloud Computing (UC), 204 IEEE/ACM 7th International Conference on Year: 2014, IEEE Conferenced Publications, pp. 914-921, (2014).
Voelz et al., "Rocco: A RoboCup Soccer Commentator System," German Research Center for Artificial Intelligence DFKI GmbH, 11 pages, (1999).
Yu et al., "Choosing the Content of Textual Summaries of Large Time-Series Data Sets," Natural Language Engineering, 13:1-28, (2007)
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2012/056513 dated Jun. 26, 2013.
International Search Report and Written Opinion for Application No. PCT/IB2012/056514 dated Jun. 26, 2013.
International Search Report and Written Opinion for Application No. PCT/IB2012/057773 dated Jul. 1, 2013.
International Search Report and Written Opinion for Application No. PCT/IB2012/057774 dated Sep. 20, 2013.
International Search Report and Written Opinion for Application No. PCT/IB2013/050375 dated May 7, 2013.
International Search Report and Written Opinion for Application No. PCT/IB2013/058131 dated Jul. 3, 2014.
International Search Report and Written Opinion for Application No. PCT/IB2014/060846 dated Feb. 4, 2015.
International Search Report and Written Opinion for Application No. PCT/US2012/053115 dated Jul. 24, 2013.
International Search Report and Written Opinion for Application No. PCT/US2012/053127 dated Jul. 24, 2013.
International Search Report and Written Opinion for Application No. PCT/US2012/053128 dated Jun. 27, 2013.
International Search Report and Written Opinion for Application No. PCT/US2012/053156 dated Sep. 26, 2013.
International Search Report and Written Opinion for Application No. PCT/US2012/053183 dated Jun. 4, 2013.
International Search Report and Written Opinion for Application No. PCT/US2012/061051 dated Jul. 24, 2013.
International Search Report and Written Opinion for Application No. PCT/US2012/063343; dated Jan. 15, 2014.
Notice of Allowance for U.S. Appl. No. 14/023,023 dated Apr. 11, 2014.

(56) References Cited

OTHER PUBLICATIONS

Notice of Allowance for U.S. Appl. No. 14/023,056 dated Apr. 29, 2014.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.
Notice of Allowance for U.S. Appl. No. 14/634,035 dated Mar. 30, 2016.
Notice of Allowance for U.S. Appl. No. 14/702,32 dated Nov. 08, 2016.
Notice of Allowance for U.S. Appl. No. 15/421,921 dated Mar. 14, 2018.
Office Action for U.S. Appl. No. 14/023,023 dated Mar. 4, 2014.
Office Action for U.S. Appl. No. 14/023,056 dated Nov. 21, 2013.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 14/702,325 dated Jul. 20, 2016.
Office Action for U.S. Appl. No. 15/074,425 dated Feb. 26, 2018.
Office Action for U.S. Appl. No. 15/074,425 dated May 10, 2017.
Office Action for U.S. Appl. No. 15/188,423 dated Oct. 23, 2017.
Office Action for U.S. Appl. No. 15/421,921 dated Mar. 14, 2018.
Office Action for U.S. Appl. No. 15/421,921 dated Sep. 27, 2017.
Statement in accordance with the Notice from the European patent Office dated Oct. 1, 2007 concerning business methods (OJ EPO Nov. 2007, 592-593, (XP002456414) 1 page.
U.S. Appl. No. 12/779,636; entitled "System And Method For Using Data To Automatically Generate A Narrative Story" filed May 13, 2010.
U.S. Appl. No. 13/186,308; entitled "Method And Apparatus For Triggering The Automatic Generation Of Narratives" filed Jul. 19, 2011.
U.S. Appl. No. 13/186,329; entitled "Method And Apparatus For Triggering The Automatic Generation Of Narratives" filed Jul. 19, 2011.
U.S. Appl. No. 13/186,337; entitled "Method And Apparatus For Triggering The Automatic Generation Of Narratives" filed Jul. 19, 2011.
U.S. Appl. No. 13/186,346; entitled "Method And Apparatus For Triggering The Automatic Generation Of Narratives" filed Jul. 19, 2011.
U.S. Appl. No. 13/464,635; entitled "Use Of Tools And Abstraction In A Configurable And Portable System For Generating Narratives" filed May 4, 2012.
U.S. Appl. No. 13/464,675; entitled "Configurable And Portable System For Generating Narratives" filed May 4, 2012.
U.S. Appl. No. 13/464,716; entitled "Configurable And Portable System For Generating Narratives" filed May 4, 2012.
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684; entitled "Method, Apparatus, And Computer Program Product For User-Directed Reporting;" filed Sep. 16, 2013.
U.S. Appl. No. 14/027,775; entitled "Method And Apparatus For Interactive Reports;" filed Sep. 16, 2013.
U.S. Appl. No. 14/311,806; entitled Method and Apparatus for Alert Validation; In re: Reiter, filed Jun. 23, 2014.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/914,461, filed Feb. 25, 2016; In re: Reiter et al., entitled Text Generation From Correlated Alerts.
U.S. Appl. No. 15/022,420, filed Mar. 16, 2016; In re: Mahamood, entitled Method and Apparatus for Document Planning.
U.S. Appl. No. 15/074,425, filed Mar. 18, 2016; In re: Reiter, entitled Method and Apparatus for Situational Analysis Text Generation.
U.S. Appl. No. 15/093,337, filed Apr. 7, 2016; In re: Reiter, entitled Method and Apparatus for Referring Expression Generation.
U.S. Appl. No. 15/093,365, filed Apr. 7, 2016; In re: Logan et al., entitled Method and Apparatus for Updating a Previously Generated Text.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.

* cited by examiner

METHOD AND APPARATUS FOR AGGREGATING WITH INFORMATION GENERALIZATION

CROSS-REFERENCE TO RELATED APPLICATIONS

This application is a continuation of U.S. application Ser. No. 14/702,325 filed May 1, 2015, which is a continuation of and claims priority to International Application No. PCT/US2012/063343, filed Nov. 2, 2012, which is hereby incorporated herein in its entirety by reference.

TECHNOLOGICAL FIELD

Embodiments of the present invention relate generally to natural language generation technologies and, more particularly, relate to a method, apparatus, and computer program product for aggregating phrase specifications.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "Securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to perform aggregation of phrase specifications. In some example embodiments, a method is provided that comprises identifying two or more generalized phrase specifications. In some example embodiments, the two or more generalized phrase specifications contain at least one aggregatable constituent. The method of this embodiment may also include generating an aggregated phrase specification from the two or more generalized phrase specifications. In some example embodiments, the aggregated phrase specification comprises a specification for a combined noun phrase generated from the aggregatable constituents and one or more additional constituents based on a determined level of generalization.

In further example embodiments, an apparatus is provided that includes at least one processor and at least one memory including computer program code with the at least one memory and the computer program code being configured, with the at least one processor, to cause the apparatus to at least identify two or more generalized phrase specifications. In some example embodiments, the two or more generalized phrase specifications contain at least one aggregatable constituent. The at least one memory and computer program code may also be configured to, with the at least one processor, cause the apparatus to generate an aggregated phrase specification from the two or more generalized phrase specifications. In some example embodiments, the aggregated phrase specification comprises at least one of a combined noun phrase generated from the at least one aggregatable constituents and one or more additional constituents based on a determined level of generalization.

In yet further example embodiments, a computer program product may be provided that includes at least one non-transitory computer-readable storage medium having computer-readable program instructions stored therein with the computer-readable program instructions including program instructions configured to identify two or more generalized phrase specifications. In some example embodiments, the two or more generalized phrase specifications contain at least one aggregatable constituent. The computer-readable program instructions may also include program instructions configured to generate an aggregated phrase specification from the two or more generalized phrase specifications. In some example embodiments, the aggregated phrase specification comprises at least one of a combined noun phrase generated from the at least one aggregatable constituents and one or more additional constituents based on a determined level of generalization.

In yet further example embodiments, an apparatus is provided that includes means for identifying two or more generalized phrase specifications. In some example embodiments, the two or more generalized phrase specifications contain at least one aggregatable constituent. The apparatus of this embodiment may also include means for generating an aggregated phrase specification from the two or more generalized phrase specifications. In some example embodiments, the aggregated phrase specification comprises at least one of a combined noun phrase generated from the at least one aggregatable constituents and one or more additional constituents based on a determined level of generalization.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

In language, words, phrases, sentences or the like may be aggregated to enhance readability, for example instead of "Stocks retreated from a broad advance yesterday. Stocks closed mixed", an aggregated sentence may recite: "Stocks retreated from a broad advance yesterday and closed mixed." As can be seen from this example, the latter sentence is more readable and flows much more naturally. By way of further example, "Pressure is stable" and "Temperature is stable" can be aggregated into a more readable sentence: "Pressure and temperature are stable". However, in some examples, the complexity of the words, phrases, sentences or the like may hinder the ability for a natural language generation system to aggregate words, phrases, sentences or the like; for example, aggregating sentences with detailed numeric values like: "Pressure is stable at 20 psi" and "Temperature is stable at 30 C".

As such, some example embodiments that are described herein are configured to aggregate phrase specifications by generalizing their respective properties or constituents, such as the detailed numeric values in the example above (e.g. 20 psi and 30 C). For example, in an instance in which 20 psi and 30 C are both within normal operating ranges, a vague descriptor that generalizes the value of 20 psi and 30 C, such as "within their normal range" or "within a standard operating range", would enable aggregation of sentences that would otherwise not be aggregatable. Thus by generalizing the numeric values, a resultant aggregated sentence may be: "Pressure and temperature are within their normal range".

The methods, apparatus and computer program products, as described herein, are configured to aggregate one or more phrase specifications. A phrase specification is a specification of the content of a linguistic constituent such as a sentence. Such representations of content include, but are not limited to, meaning text theory (e.g. SemR, DSyntR and/or SSyntR), lambda calculus representations of semantics, case frames, messages, pre-constructed surface form fragments and/or like. As such, in some example embodiments, one or more phrase specifications and a domain-specific function which specifies allowable generalizations (e.g. generalizations of constituents within the phrase specification that do not significantly reduce utility of an output text from an end-user's perspective) of those one or more phrase specifications may be identified. In some example embodiments, the one or more phrase specifications may be aggregated based on the generalization and/or removal of one or more constituents (e.g. a coherent subpart of a phrase specification, such as, but not limited to, a property within a message, an argument to a predicate, a syntactic subconstituent within a larger syntactic element, a role within a case frame and/or like) within the phrase specification. After generalization, the one or more generalized phrase specifications may be compared and those generalized phrase specifications of the one or more generalized phrase specifications that can be aggregated (e.g. are identical but for an aggregatable constituent) are placed into groups. For each group of phrase specifications, a level of generalization may then be determined that still enables the group of phrase specifications to be aggregated. In some example embodiments, the aggregatable constituents may be combined or otherwise merged to create an aggregated phrase specification. In some example embodiments, the aggregated phrase specification may contain one or more additional constituents based on the determined level of generalization.

Figure 1:
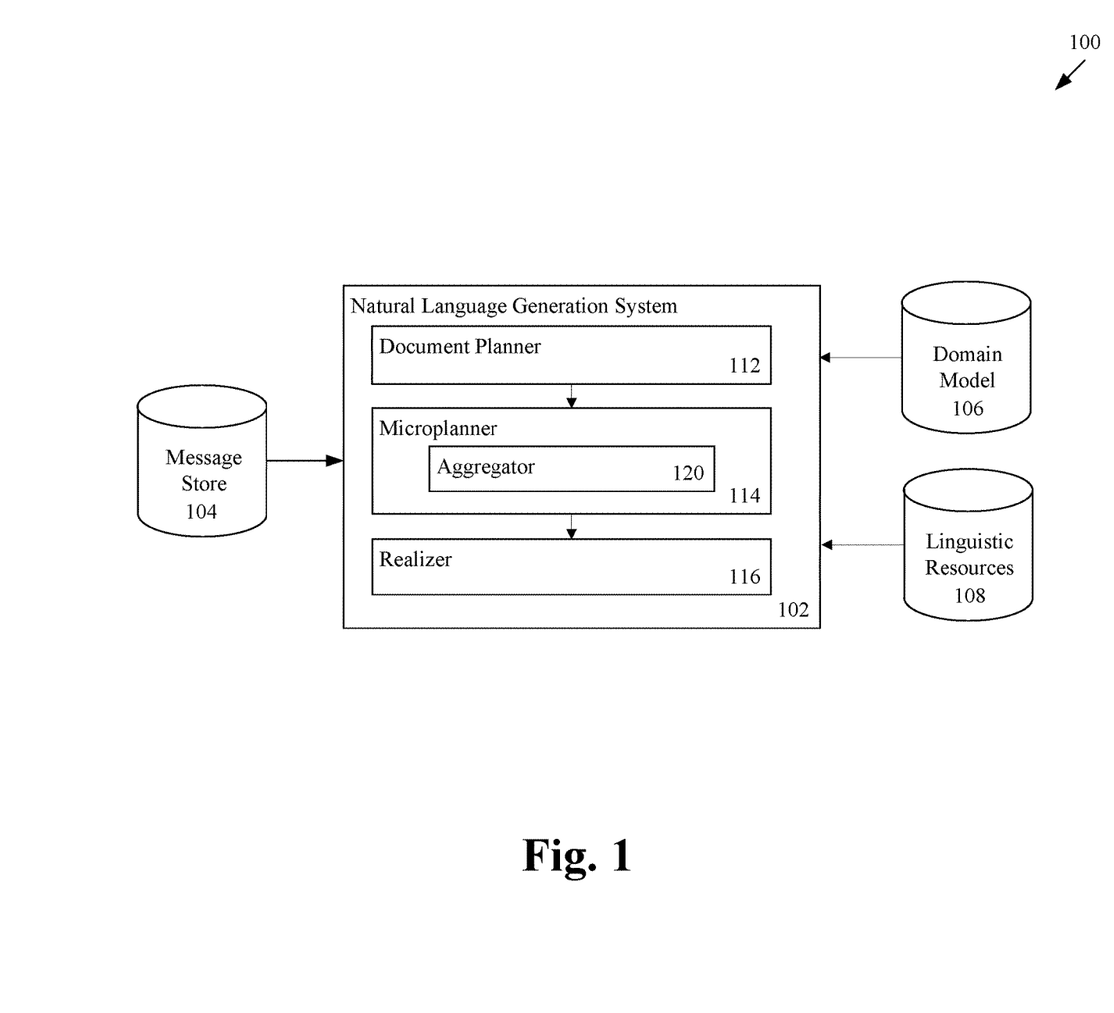
FIG. 1 is a schematic representation of a natural language generation environment that may benefit from some example embodiments of the present invention.

FIG. 1 is an example block diagram of example components of an example natural language generation environment 100. In some example embodiments, the natural language generation environment 100 comprises a natural language generation system 102, message store 104, a domain model 106 and/or linguistic resources 108. The natural language generation system 102 may take the form of, for example, a code module, a component, circuitry and/or the like. The components of the natural language generation environment 100 are configured to provide various logic (e.g. code, instructions, functions, routines and/or the like) and/or services related to the natural language generation system, the microplanner and a referring expression generation system.

A message store 104 or knowledge pool is configured to store one or more messages that are accessible by the natural language generation system 102. Messages are one example of a phrase specification described herein and are language independent data structures that correspond to informational elements in a text and/or collect together underlying data, referred to as properties, arguments or slots, which can be presented within a fragment of natural language such as a phrase or sentence. Messages may be represented in various ways; for example, each property may consist of a named attribute and its corresponding value; these values may recursively consist of sets of named attributes and their values, and each message may belong to one of a set of predefined types. The concepts and relationships that make up messages may be drawn from an ontology (e.g. a domain model 106) that formally represents knowledge about the application scenario. In some examples, the domain model 106 is a representation of information about a particular domain and specifies how information about a domain is communicated in language. For example, a domain model may contain an ontology that specifies the kinds of objects, instances, concepts and/or the like that may exist in the domain in concrete or abstract form, properties that may be predicated of the objects, concepts and the like, relationships that may hold between the objects, concepts and the like, and representations of any specific knowledge that is required to function in the particular domain. The domain model 106 may also contain a set of rules for generalization, removal and/or aggregation of phrase specifications that are generated based on a corpus analysis, domain analysis or the like.

In some example embodiments, a natural language generation system, such as natural language generation system 102, is configured to generate words, phrases, sentences, text or the like which may take the form of a natural language text. The natural language generation system 102 comprises a document planner 112, a microplanner 114 and/or a realizer 116. The natural language generation system 102 may also be in data communication with the message store 104, the domain model 106 and/or the linguistic resources 108. In some examples, the linguistic resources include, but are not limited to, text schemas, aggregation rules, reference rules, lexicalization rules and/or grammar rules that may be used by one or more of the document planner 112, the microplanner 114 and/or the realizer 116. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 112 is configured to input one or more messages from the message store 104. The document planner 112 may comprise a content determination process that is configured to select the messages, such as the messages that contain a representation of the data that is to be output via a natural language text. The document planner 112 may also comprise a structuring process that determines the order of messages to be included in a text. In some example embodiments, the document planner 112 may access one or more text schemas for the purposes of content determination and document structuring. The output of the document planner 112 may be a tree-structured object or other data structure that is referred to as a document plan. In an instance in which a tree-structured object is chosen for the document plan, the leaf nodes of the tree may contain the messages, and the intermediate nodes of the tree structure object may be configured to indicate how the subordinate nodes are related (e.g. elaboration, consequence, contrast, sequence and/or the like) to each other.

The microplanner 114 is configured to construct a realization specification based on the document plan output from the document planner 112, such that the document plan may be expressed in natural language. In some example embodiments, the microplanner 114 may convert one or more messages into a text specification by performing aggregation, lexicalization and referring expression generation. A text specification is a specification of the content of a linguistic constituent such as a sentence and contains a set of instructions for a realizer, such as realizer 116, to produce a grammatically well-formed text. The output of the microplanner 114, in some example embodiments, is a tree-structured realization specification whose leaf-nodes are text specifications, and whose internal nodes express rhetorical relations between the leaf nodes. The microplanner 114 and the aggregator 120 are further described with reference to FIG. 2.

A realizer 116 is configured to traverse a text specification output by the microplanner 114 to express the text specification in natural language. The realization process that is applied to each text specification makes use of a grammar (e.g. the grammar of the linguistic resources 108) which specifies the valid syntactic structures in the language and further provides a way of mapping from phrase specifications into the corresponding natural language sentences. The output of the process is, in some example embodiments, a natural language text.

Figure 2:
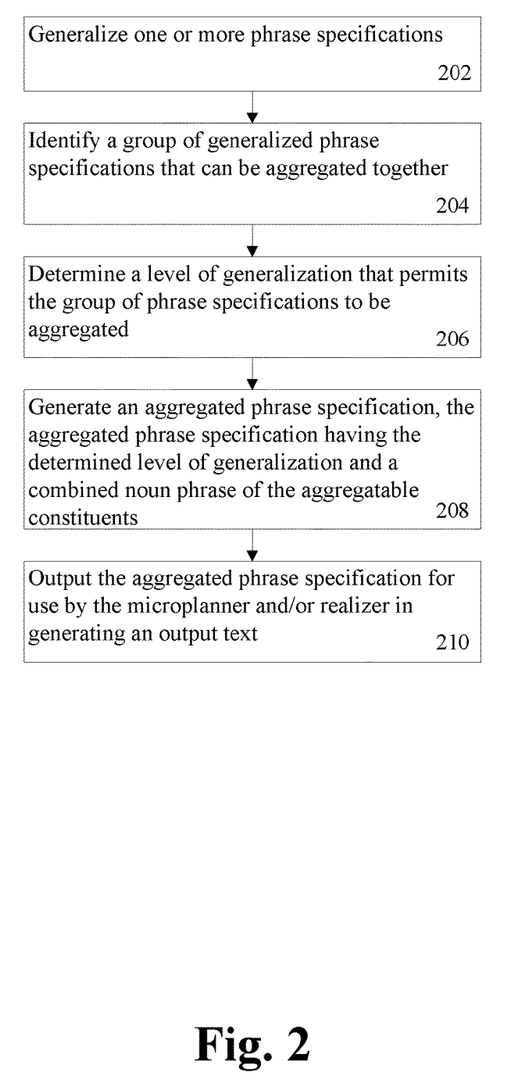
FIG. 2 illustrates an example flow diagram that may be performed by an aggregator in accordance with some example embodiments of the present invention.

FIG. 2 illustrates an example flow diagram that may be performed by a microplanner 114, an aggregator 120 and/or the like in accordance with some example embodiments of the present invention. In some example embodiments, the microplanner 114 may cause the aggregator 120 to input or the aggregator 120 may otherwise input one or more phrase specifications. The aggregator 120 may then identify or otherwise determine a constituent in the one or more phrase specifications that is aggregatable. In some example embodiments, the aggregatable constituent may refer to an entity, such as heart rate, respiration rate, temperature, pressure and/or the like. Alternatively or additionally, a phrase specification may contain multiple aggregatable constituents and, as such, the use of aggregatable constituent herein should not be considered as limiting the disclosure to a single aggregatable constituent in a phrase specification.

A phrase specification may also have one or more constituents that are generalizable or removable. Constituents that are generalizable or removable may be defined by the domain model 106 for a particular domain and/or may be identified based on a corpus analysis, business rules, user settings and/or the like. For example, a particular value, such as a temperature, may be generalized by a range such as "below the normal range", "in the normal range" or "above the normal range" in some domains, but in other domains such a generalization may be improper. In further example embodiments, the domain model 106 may contain a generalized constituent list which provides a list of alternative generalized constituents for a given generalizable constituent. The domain model 106 may also define the various levels of generalization for each generalizable constituent. For example, the domain model may identify "within a normal range" as the most generalized constituent; whereas, other more specific generalizations may be available, such as "between 25 C and 35 C". Alternatively or additionally, the microplanner 114, the aggregator 120 or the like may receive or otherwise determine, via a reordering flag, whether the one or more phrase specifications can be reordered for the purposes of aggregation.

As such, and as shown in block 202, the one or more phrase specifications may be generalized. Such a generalization may include, but is not limited to, generalizing all of the constituents that are marked as generalizable by the aggregator 120 and/or removing all of the constituents that are marked as removable by the aggregator 120. In some example embodiments, the constituents may be generalized using a generalized constituent marked as most generalized in the generalized constituent list or predefined constituent list. The generalized constituent list may contain one or more constituents that may be selected by the aggregator 120 to replace a generalizable constituent in a phrase specification. For example, the constituent "last Sunday" may be generalized by, from least generalized or lowest level of generalization to most generalized or highest level of generalization, "earlier this week", "earlier this month", or "in the past". Alternatively or additionally, a portion of the constituents marked as generalizable may be generalized and/or a portion of the constituents marked as removable may be removed.

As is shown in block 204, a group of generalized phrase specifications that can be aggregated together are identified by the aggregator 120. For example, sequences of phrase specifications (if reordering is not permitted based on the reordering flag) or subsets of the generalized phrase specifications (if reordering is permitted based on the reordering flag) may be identified as being aggregatable in an instance in which the sequences or subsets of phrase specifications are identical except for their identified aggregatable constituent. For example, if the aggregatable constituent of "pressure is stable within normal range" is "pressure" and the aggregatable constituent of "temperature is stable within normal range" is "temperature", then the aggregator 120 may determine that the remaining constituents, namely "is stable within normal range" and "is stable within normal range" are identical and thus may determine the phrase specifications are aggregatable. Alternatively or additionally, phrase specifications may also be aggregated based on an indication in the domain model 106, business rules, a user setting and/or the like.

In some example embodiments, the one or more phrase specifications are generalized to a highest level of generalization at block 202 to identify groups of phrase specifications that can be aggregated. Once those groups of phrase specifications are identified, then at block 206, the level of generalization may be reduced or otherwise lowered so long as the group of phrase specifications can still be aggregated. For example, constituents may be added back that were removed so long as the group of phrase specifications can still be aggregated. As is shown in block 206, a level of generalization that permits the group of phrase specifications to still be aggregated is determined by the aggregator 120. In some example embodiments, the constituents that were removed at block 202 may be added back to the phrase specifications in the group providing the phrase specifications in the group are still aggregatable. In some example embodiments, a generalized constituent may be added back to the phrase specification instead of the removed constituent if the generalized constituent enables the group of phrase specification to still be aggregatable whereas adding the removed constituent would render the group of phrase specifications no longer aggregatable. Alternatively or additionally, less generalized constituents, as defined by the generalized constituent listing, may replace the generalized constituents providing the phrase specifications in the group are still aggregatable.

Alternatively or additionally, other methods of generalization may be used by the aggregator 120, for example, the aggregator 120 may incrementally generalize one or more phrase specifications until the one or more phrase specifications are aggregatable, alternatively the aggregator 120 may determine multiple levels of generalization for each phrase specification and aggregate the phrase specifications based on the lowest level of generalization, and/or the like.

At block 208, an aggregated phrase specification is generated. In some example embodiments, the aggregated phrase specification may contain a combination of the constituents, such as a combined noun phrase, that contains the identified aggregatable constituents and further contains one or more additional constituents based on the determined level of generalization. For example, the aggregated phrase specification may contain the combined noun phrase and the one or more generalized constituents but may otherwise be a copy of a phrase specification of the one or more phrase specifications in the group of phrase specifications. At block 210 the aggregated phrase specification may be output by the aggregator 120 to the microplanner and/or realizer for use in generating an output text.

By way of example and with reference to FIG. 2, the aggregator 120 may input one or more phrase specifications (shown as sentences in this example), such as "heart rate was stable at 72 yesterday", "mean blood pressure was unstable yesterday with mean value 95" and "respiratory rate was stable at 16 yesterday". In order to generalize the one or more phrase specifications, those constituents that are generalizable or removable may be identified. For example, "at 72" in "heart rate was stable at 72 yesterday" and "at 16" in "respiratory rate was stable at 16 yesterday" may be marked as generalizable based on the domain model, business rules, a user setting and/or the like. In some examples, both "at 72" and "at 16" may be generalized as "within the normal range" based on a generalizable constituent listing in the domain model. In some examples, "yesterday" in both "heart rate was stable at 72 yesterday" and "respiratory rate was stable at 16 yesterday" may be marked as removable. Both "with mean value 95" and "yesterday" may also be marked as removable in "mean blood pressure was unstable yesterday with mean value 95". Those constituents marked as removable may be indicated as such by the domain model, business rules, a user setting and/or the like.

As such, the one or more phrase specifications may be generalized by removing each of the removable constituents and by replacing each of the generalizable constituents with generalized constituents. The one or more generalized phrase specifications may then contain: "heart rate was stable within normal range", "mean blood pressure was unstable" and "respiratory rate was stable within normal range" in some example embodiments.

A group of generalized phrase specifications may then be identified. A group of generalized phrase specifications may include those phrase specifications that can be aggregated (e.g. phrase specifications that are identical but for the aggregatable constituent). In an instance in which reordering is permitted, "heart rate was stable within normal range" and "respiratory rate was stable within normal range" may be determined as aggregatable because they are identical but for the aggregatable constituents "heart rate" and "respiratory rate" and thus form a group. "Mean blood pressure was unstable" is not aggregatable with the other phrase specifications based on the constituent "was unstable". Reordering would be necessary in this example, because the original input had "heart rate was stable within normal range" as the first phrase specification, "mean blood pressure was unstable" as the second phrase specification and "respiratory rate was stable within normal range" as the third specification. As such, for "heart rate was stable within normal range" and "respiratory rate was stable within normal range" would be reordered. In an instance in which reordering as not permitted then these phrase specifications would not be aggregatable.

Once a group of phrase specifications consisting of "heart rate was stable within normal range" and "respiratory rate was stable within normal range" is determined to be aggregatable, those phrase specifications within the group are analyzed to determine the level of generalization that would still enable the phrase specifications within the group to be aggregated. For example, the constituent "yesterday" was removed from both phrase specifications and, as such, the addition of the constituent "yesterday" back to the phrase specifications would still enable the phrase specifications to be aggregated because each of the phrase specifications in the group would remain identical but for the aggregatable constituent. Whereas, there may not be a more specific way to express the constituents "at 72" and "at 16" in a similar manner and, as such, the generalization "within the normal range" may represent the lowest level of generalization that is available for these phrase specifications. Consequently, the phrase specifications to be aggregated may include "heart rate was stable within normal range yesterday" and "respiratory rate was stable within normal range yesterday".

The aggregatable constituents, "heart rate" and "respiratory rate" may be combined to form combined noun phrase "heart rate and respiratory rate". In some examples, the aggregator 120 may generate the noun phrase "heart and respiratory rate". "Heart and respiratory rate" may then be combined with or otherwise instantiated in an aggregated phrase specification with the remaining constituents in a phrase specification of the group of phrase specifications. The aggregated phrase specification is configured to contain those constituents of the phrase specification of the group of phrase specifications based on the determined level of generalization (e.g. "were stable within normal range yesterday"). As such, the resultant aggregated phrase specification contains "heart and respiratory rate were stable within normal range yesterday". Therefore, an output text may include the aggregated phrase specification "heart and respiratory rate were stable within normal range yesterday" and any unchanged (e.g. not aggregated) phrase specifications in original form (e.g. not generalized), such as "mean blood pressure was unstable yesterday with mean value 95".

Figure 3:
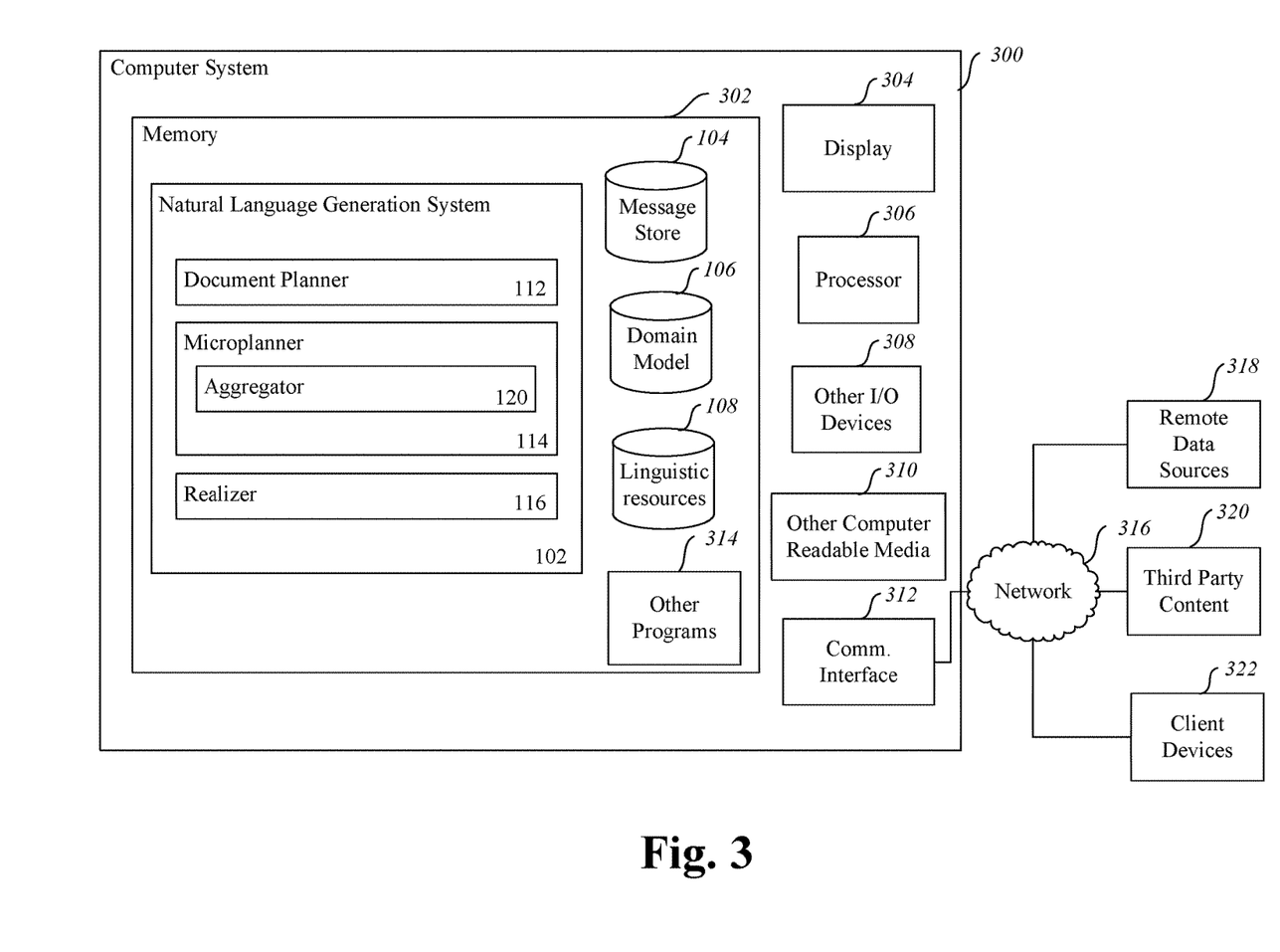
FIG. 3 illustrates a block diagram of an apparatus that embodies a natural language generation environment having an aggregator in accordance with some example embodiments of the present invention.

FIG. 3 is an example block diagram of an example computing device for practicing embodiments of an example aggregator. In particular, FIG. 3 shows a computing system 300 that may be utilized to implement a natural language generation environment having a natural language generation system 102 including, in some examples, a document planner 112, a microplanner 114 having an aggregator 120 and/or a realizer 116. One or more general purpose or special purpose computing systems/devices may be used to implement the natural language generation system 102. In addition, the computing system 300 may comprise one or more distinct computing systems/devices and may span distributed locations. In some example embodiments, the natural language generation system 102 may be configured to operate remotely via the network 316. In other example embodiments, a pre-processing module or other module that requires heavy computational load may be configured to perform that computational load and thus may be on a remote device or server. For example, the realizer 116 may be accessed remotely. As such, the natural language generation environment may be operable remotely, such as via a cloud source, may be operable on a client device that embodies at least a portion of the one or more blocks, and/or the like. Furthermore, each block shown may represent one or more such blocks as appropriate to a specific example embodiment. In some cases one or more of the blocks may be combined with other blocks. Also, the natural language generation system 102 may be implemented in software, hardware, firmware, or in some combination to achieve the capabilities described herein.

In the example embodiment shown, computing system 300 comprises a computer memory ("memory") 302, a display 304, one or more processors 306, input/output devices 308 (e.g., keyboard, mouse, CRT or LCD display, touch screen, gesture sensing device and/or the like), other computer-readable media 310, and communications interface 312. The processor 306 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 3 as a single processor, in some embodiments the processor 306 comprises a plurality of processors. The plurality of processors may be in operative communication with each other and may be collectively configured to perform one or more functionalities of the reference system as described herein.

The natural language generation system 102 is shown residing in memory 302. The memory 302 may comprise, for example, transitory and/or non-transitory memory, such as volatile memory, non-volatile memory, or some combination thereof. Although illustrated in FIG. 3 as a single memory, the memory 302 may comprise a plurality of memories. The plurality of memories may be embodied on a single computing device or may be distributed across a plurality of computing devices collectively configured to function as the natural language system, the microplanner and/or the reference system. In various example embodiments, the memory 302 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the natural language generation system 102 may be stored on and/or transmitted over the other computer-readable media 310. The components of the natural language generation system 102 preferably execute on one or more processors 306 and are configured to enable operation of an aggregator, as described herein.

Alternatively or additionally, other code or programs 314 (e.g., an administrative interface, a Web server, and the like) and potentially other data repositories, such as other data sources, also reside in the memory 302, and preferably execute on one or more processors 306. Of note, one or more of the components in FIG. 3 may not be present in any specific implementation. For example, some embodiments may not provide other computer readable media 310 or a display 304.

The natural language generation system 102 is further configured to provide functions such as those described with reference to FIG. 1. The natural language generation system 102 may interact with the network 316, via the communications interface 312, with remote data sources 318 (e.g. remote reference data, remote performance data, remote aggregation data, remote knowledge pools and/or the like), third-party content providers 320 and/or client devices 322. The network 316 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 316 may take the form of the internet or may be embodied by a cellular network such as an LTE based network. In this regard, the communications interface 312 may be capable of operating with one or more air interface standards, communication protocols, modulation types, access types, and/or the like. The client devices 322 include desktop computing systems, notebook computers, mobile phones, smart phones, personal digital assistants, tablets and/or the like.

In an example embodiment, components/modules of the natural language generation system 102 are implemented using standard programming techniques. For example, the natural language generation system 102 may be implemented as a "native" executable running on the processor 306, along with one or more static or dynamic libraries. In other embodiments, the natural language generation system 102 may be implemented as instructions processed by a virtual machine that executes as one of the other programs 314. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 102, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The message store 104, the domain model 106 and/or the linguistic resources 108 may be implemented as one or more database systems, file systems, or any other technique for storing such information, or any combination of the above, including implementations using distributed computing techniques. Alternatively or additionally, the message store 104, the domain model 106 and/or the linguistic resources 108 may be local data stores but may also be configured to access data from the remote data sources 318.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable and/or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 4:
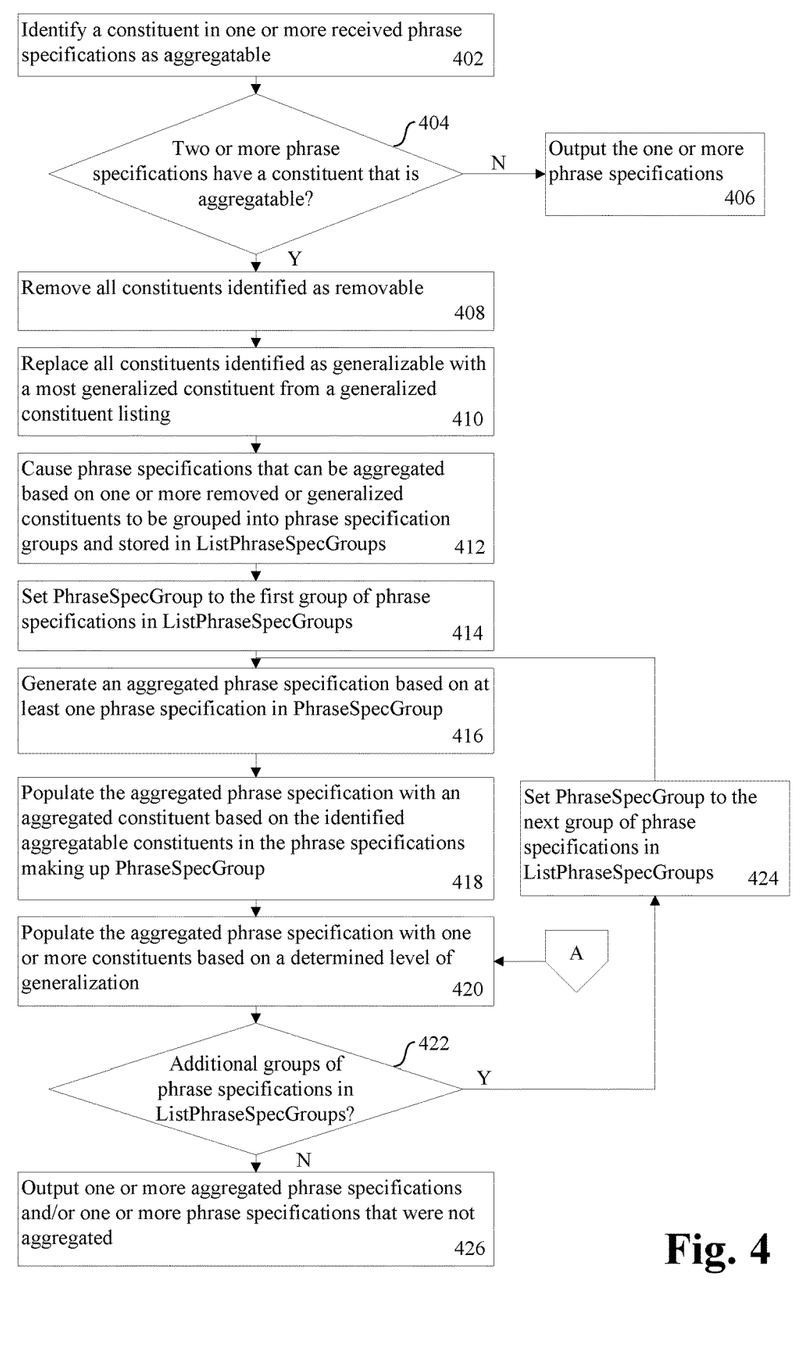
FIGS. 4-5 illustrate flowcharts that may be performed by an aggregator in accordance with some example embodiments of the present invention.

FIG. 4 is a flowchart illustrating an example method performed in accordance with some example embodiments described herein. As is shown in operation 402, an apparatus may include means, such as the microplanner 114, the aggregator 120, the processor 306, or the like, for identifying a constituent in one or more phrase specifications as aggregatable. As is shown in decision operation 404, an apparatus may include means, such as the microplanner 114, the aggregator 120, the processor 306, or the like, for determining whether two or more of the received phrase specifications contain a constituent that is aggregatable. If not, then as is shown in operation 406, an apparatus may include means, such as the microplanner 114, the aggregator 120, the processor 306, or the like, for outputting the one or more received phrase specifications.

If there are two are more phrase specifications that contain a constituent that is aggregatable, then the phrase specifications may be generalized in operations 408 and 410 to create one or more generalized phrase specifications. A phrase specification may be generalized by identifying constituents in the phrase specification that are either generalizable or removable. As is shown in operation 408, an apparatus may include means, such as the microplanner 114, the aggregator 120, the processor 306, or the like, for removing all constituents identified as removable. As is shown in operation 410, an apparatus may include means, such as the microplanner 114, the aggregator 120, the processor 306, or the like, for replacing all constituents identified as generalizable with a most generalized constituent from a generalized constituent listing.

As is shown in operation 412, an apparatus may include means, such as the microplanner 114, the aggregator 120, the processor 306, or the like, for causing phrase specifications that can be aggregated, based on one or more removed or generalized constituents, to be grouped into phrase specification groups and stored in a data structure ListPhraseSpecGroups. In some example embodiments, the two or more generalized phrase specifications are identified as aggregatable in an instance in which each of the two or more generalized phrase specifications are identical but for the aggregatable constituents in each of the two or more generalized phrase specifications.

Operations 414-424, in some example embodiments, are configured to generate aggregated phrase specifications for each of the groups of phrase specifications. As is shown in operation 414, an apparatus may include means, such as the microplanner 114, the aggregator 120, the processor 306, or the like, for setting a data structure PhraseSpecGroup to a first group of phrase specifications in ListPhraseSpecGroups.

As is shown in operation 416, an apparatus may include means, such as the microplanner 114, the aggregator 120, the processor 306, or the like, for generating an aggregated phrase specification based on at least one phrase specification in PhraseSpecGroup. As is shown in operation 418, an apparatus may include means, such as the microplanner 114, the aggregator 120, the processor 306, or the like, for populating the aggregated phrase specification with a combined noun phrase or other aggregation of the constituents that are identified as aggregatable constituents in the phrase specifications in PhraseSpecGroup. As is shown in operation 420, an apparatus may include means, such as the microplanner 114, the aggregator 120, the processor 306, or the like, for populating the aggregated phrase specification with one or more constituents based on a determined level of generalization. Populating the aggregated phrase specification with one or more constituents based on a determined level of generalization is further described with reference to FIG. 5.

As is shown in decision operation 422, an apparatus may include means, such as the microplanner 114, the aggregator 120, the processor 306, or the like, for determining whether there are additional groups of phrase specifications in ListPhraseSpecGroups. If so, then as is shown in operation 424, an apparatus may include means, such as the microplanner 114, the aggregator 120, the processor 306, or the like, for setting PhraseSpecGroup to the next group of phrase specifications in ListPhraseSpecGroups. The process then loops back to operation 416. If there are not an additional group of phrase specifications in ListPhraseSpecGroups, then, as is shown in operation 426, an apparatus may include means, such as the microplanner 114, the aggregator 120, the processor 306, or the like, for outputting one or more aggregated phrase specifications and/or one or more phrase specifications that were not aggregated.

Figure 5:
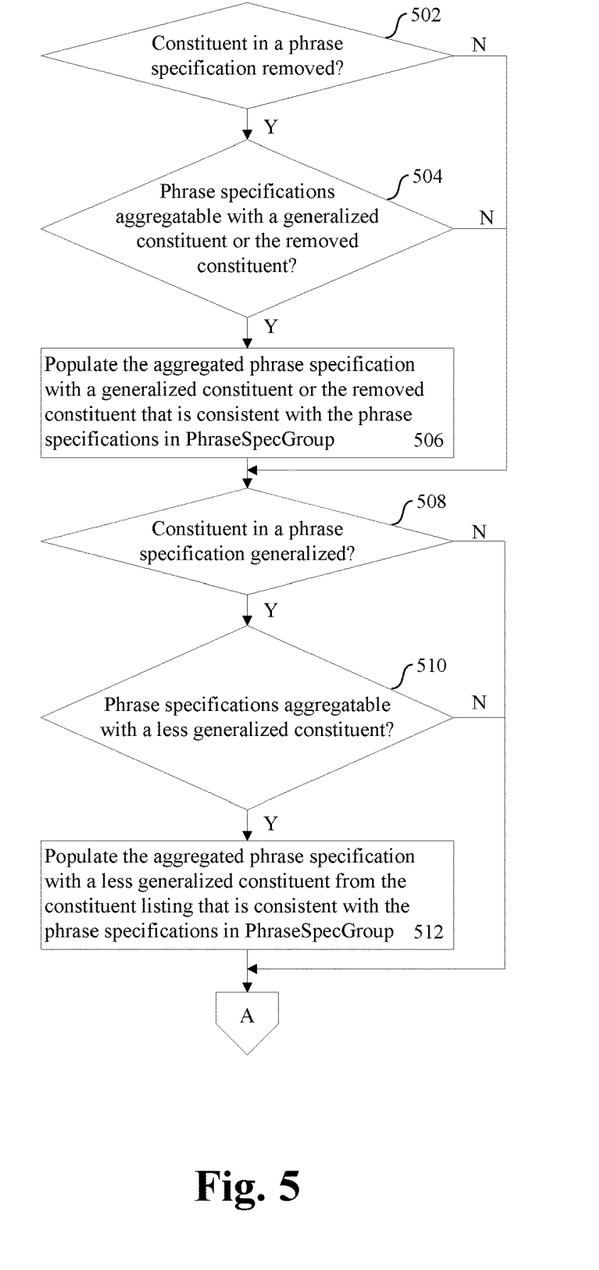

FIG. 5 is a flowchart illustrating an example method of populating the aggregated phrase specification with one or more constituents based on a determined level of generalization performed in accordance with some example embodiments described herein. As is shown in decision operation 502, an apparatus may include means, such as the microplanner 114, the aggregator 120, the processor 306, or the like, for determining whether a constituent was removed in operation 408 from a phrase specification in PhraseSpecGroup. If not, then the process continues to decision operation 508.

If a constituent was removed in operation 408, then, as is shown in decision operation 504, an apparatus may include means, such as the microplanner 114, the aggregator 120, the processor 306, or the like, for determining whether the phrase specifications in PhraseSpecGroup would still be aggregatable with the removed constituent or a generalized version of the removed constituent. If not, then the process continues to decision operation 508.

If the phrase specifications in PhraseSpecGroup would still be aggregatable with the removed constituent or a generalized version of the removed constituent, then, as is shown in operation 506, an apparatus may include means, such as the microplanner 114, the aggregator 120, the processor 306, or the like, for populating the aggregated phrase specification with the removed constituent or a generalized constituent of the removed constituent provided that it is consistent with the other phrase specifications in PhraseSpecGroup and, as such, the PhraseSpecGroup is still aggregatable.

As is shown in decision operation 508, an apparatus may include means, such as the microplanner 114, the aggregator 120, the processor 306, or the like, for determining whether a constituent was generalized in operation 410 from a phrase specification in PhraseSpecGroup. If not, then the process ends.

If a constituent was generalized in operation 410, then, as is shown in decision operation 510, an apparatus may include means, such as the microplanner 114, the aggregator 120, the processor 306, or the like, for determining whether the phrase specifications in PhraseSpecGroup would still be aggregatable with a less generalized version of the generalized constituent. If not, then the process ends.

If the phrase specifications in PhraseSpecGroup would still be aggregatable with a less generalized version of the generalized constituent, then, as is shown in operation 512, an apparatus may include means, such as the microplanner 114, the aggregator 120, the processor 306, or the like, for populating the aggregated phrase specification with another generalized constituent, such as a less generalized constituent, from the constituent listing provided that it is consistent with the other phrase specifications in PhraseSpecGroup and, as such, the PhraseSpecGroup is still aggregatable. In some example embodiments and provided one or more generalized constituents would still enable the PhraseSpecGroup to be aggregatable, the aggregator 120 is configured to select the least generalized constituent or the constituent that closest to the original constituent. Alternatively or additionally, a generalized constituent may be generated based on a predefined constituent listing that is defined by the domain model and is configured to provide constituents from least general to most general.

FIGS. 2 and 4-5 illustrate example flowcharts of the operations performed by an apparatus, such as computing system 300 of FIG. 3, in accordance with example embodiments of the present invention. It will be understood that each block of the flowcharts, and combinations of blocks in the flowcharts, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 302 of an apparatus employing an embodiment of the present invention and executed by a processor 306 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 2 and 4-5, when executed, convert a computer or processing circuitry into a particular machine configured to perform an example embodiment of the present invention. Accordingly, the operations of FIGS. 2 and 4-5 define an algorithm for configuring a computer or processor, to perform an example embodiment. In some cases, a general purpose computer may be provided with an instance of the processor which performs the algorithm of FIGS. 2 and 4-5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described herein. Moreover, in some embodiments additional optional operations may also be included. It should be appreciated that each of the modifications, optional additions or amplifications described herein may be included with the operations herein either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for generating language by transforming raw input data that is at least partially expressed in a non-linguistic format into a format that can be expressed linguistically in a textual output, the method comprising:
generating a plurality of phrase specifications from the raw input data;
identifying a domain model based on the plurality of phrase specifications, wherein the domain model includes at least one domain rule;
identifying one or more phrase specifications from the plurality of phrase specifications, wherein each of the one or more phrase specifications contains at least one aggregatable constituent;
generating one or more generalized phrase specifications from the one or more phrase specifications based at least in part on the at least one domain rule; and
generating the textual output, based at least in part on the one or more generalized phrase specifications, such that is it displayable on a user interface.

2. A method according to claim 1, further comprising:
identifying two or more generalized phrase specifications, wherein each of the two or more generalized phrase specifications contains the at least one aggregatable constituent;
generating an aggregated phrase specification from the two or more generalized phrase specifications based at least in part on the at least one domain rule, wherein the aggregated phrase specification comprises at least one of a combined noun phrase generated from the at least one aggregatable constituent and one or more additional constituents based on a determined level of generalization; and
generating the textual output, based at least in part on the aggregated phrase specification, such that it is displayable on a user interface.

3. A method according to claim 2, further comprising:
determining one or more constituents that are removable in one or more phrase specifications based at least in part on the at least one domain rule; and
removing the one or more constituents that are removable, such that the one or more phrase specifications are one or more generalized phrase specifications.

4. A method according to claim 1, further comprising:
determining one or more constituents that are generalizable in one or more phrase specifications;
determining a generalized constituent for at least one of the one or more generalizable constituents based at least in part on the at least one domain rule; and
replacing the one or more generalized constituents with the determined generalized constituent, such that the one or more phrase specifications are one or more generalized phrase specifications.

5. A method according to claim 4, wherein the generalized constituent is a most generalized constituent in a predefined constituent listing.

6. A method according to claim 3, further comprising:
removing all of the one or more constituents from the one or more phrase specifications that are removable; and
replacing all of the one or more generalizable constituents from the one or more phrase specifications with the determined generalized constituent, such that the one or more phrase specifications are one or more generalized phrase specifications.

7. A method according to claim 1, wherein the two or more generalized phrase specifications are identified as aggregatable in an instance in which each of the two or more generalized phrase specifications are identical but for the at least one aggregatable constituent in each of the two or more generalized phrase specifications.

8. A method according to claim 1, further comprising:
generating the combined noun phrase using the at least one aggregatable constituent in the two or more generalized phrase specifications.

9. A method according to claim 1, further comprising:
determining that the two or more generalized phrase specifications are still identified as aggregatable with a constituent that is removed; and
populating the aggregated phrase specification with at least one of a generalized constituent or a removed constituent.

10. A method according to claim 1, further comprising:
determining that the two or more generalized phrase specifications are still identified as aggregatable with a constituent that is less generalized than a generalized constituent; and populating the aggregated phrase specification with the constituent that is less generalized than the generalized constituent based on a predefined constituent listing.

11. An apparatus for generating language by transforming raw input data that is at least partially expressed in a non-linguistic format into a format that can be expressed linguistically in a textual output, the apparatus comprising:
at least one processor; and
at least one memory including computer program code, the at least one memory and the computer program code configured to, with the at least one processor, cause the apparatus to at least:
generate a plurality of phrase specifications from the raw input data;
identify a domain model based on the plurality of phrase specifications, wherein the domain model includes at least one domain rule;
identify one or more phrase specifications from the plurality of phrase specifications, wherein each of the one or more phrase specifications contains at least one aggregatable constituent;
generate one or more generalized phrase specifications from the one or more phrase specifications based at least in part on the at least one domain rule; and
generate the textual output, based at least in part on the one or more generalized phrase specifications, such that is it displayable on a user interface.

12. An apparatus according to claim 11, wherein the at least one memory including the computer program code is further configured to, with the at least one processor, cause the apparatus to:
identify two or more generalized phrase specifications, wherein each of the two or more generalized phrase specifications contains the at least one aggregatable constituent;
generate an aggregated phrase specification from the two or more generalized phrase specifications based at least in part on the at least one domain rule, wherein the aggregated phrase specification comprises at least one of a combined noun phrase generated from the at least one aggregatable constituent and one or more additional constituents based on a determined level of generalization; and
generate the textual output, based at least in part on the aggregated phrase specification, such that it is displayable on a user interface.

13. An apparatus according to claim 12, wherein the at least one memory including the computer program code is further configured to, with the at least one processor, cause the apparatus to:
determine one or more constituents that are removable in one or more phrase specifications based at least in part on the at least one domain rule; and
remove the one or more constituents that are removable, such that the one or more phrase specifications are one or more generalized phrase specifications.

14. An apparatus according to claim 11, wherein the at least one memory including the computer program code is further configured to, with the at least one processor, cause the apparatus to:
determine one or more constituents that are generalizable in one or more phrase specifications;
determine a generalized constituent for at least one of the one or more generalizable constituents based at least in part on the at least one domain rule; and replace the one or more generalized constituents with the determined generalized constituent, such that the one or more phrase specifications are one or more generalized phrase specifications.

15. An apparatus according to claim 14, wherein the generalized constituent is a most generalized constituent in a predefined constituent listing.

16. An apparatus according to claim 13, wherein the at least one memory including the computer program code is further configured to, with the at least one processor, cause the apparatus to:
remove all of the one or more constituents from the one or more phrase specifications that are removable; and
replace all of the one or more generalizable constituents from the one or more phrase specifications with the determined generalized constituent, such that the one or more phrase specifications are one or more generalized phrase specifications.

17. An apparatus according to claim 11, wherein the two or more generalized phrase specifications are identified as aggregatable in an instance in which each of the two or more generalized phrase specifications are identical but for the at least one aggregatable constituent in each of the two or more generalized phrase specifications.

18. An apparatus according to claim 11, wherein the at least one memory including the computer program code is further configured to, with the at least one processor, cause the apparatus to:
generate the combined noun phrase using the at least one aggregatable constituent in the two or more generalized phrase specifications.

19. An apparatus according to claim 11, wherein the at least one memory including the computer program code is further configured to, with the at least one processor, cause the apparatus to:
determine that the two or more generalized phrase specifications are still identified as aggregatable with a constituent that is removed; and
populate the aggregated phrase specification with at least one of a generalized constituent or a removed constituent.

20. An apparatus according to claim 11, wherein the at least one memory including the computer program code is further configured to, with the at least one processor, cause the apparatus to:
determine that the two or more generalized phrase specifications are still identified as aggregatable with a constituent that is less generalized than a generalized constituent; and
populate the aggregated phrase specification with the constituent that is less generalized than the generalized constituent based on a predefined constituent listing.

21. A computer program product for generating language by transforming raw input data that is at least partially expressed in a non-linguistic format into a format that can be expressed linguistically in a textual output, the computer program product comprising:
at least one computer readable non-transitory memory medium having program code instructions stored thereon, the program code instructions, which when executed by an apparatus, cause the apparatus at least to:
generate a plurality of phrase specifications from the raw input data;
identify a domain model based on the plurality of phrase specifications, wherein the domain model includes at least one domain rule;

identify one or more phrase specifications from the plurality of phrase specifications, wherein each of the one or more phrase specifications contains at least one aggregatable constituent;

generate one or more generalized phrase specifications from the one or more phrase specifications based at least in part on the at least one domain rule; and generate the textual output, based at least in part on the one or more generalized phrase specifications, such that is it displayable on a user interface.

22. A computer program product according to claim 21 further comprises program code instructions, which when executed by an apparatus, further cause the apparatus at least to:

identify two or more generalized phrase specifications, wherein each of the two or more generalized phrase specifications contains the at least one aggregatable constituent;

generate an aggregated phrase specification from the two or more generalized phrase specifications based at least in part on the at least one domain rule, wherein the aggregated phrase specification comprises at least one of a combined noun phrase generated from the at least one aggregatable constituent and one or more additional constituents based on a determined level of generalization; and generate the textual output, based at least in part on the aggregated phrase specification, such that it is displayable on a user interface.

23. A computer program product according to claim 22 further comprises program code instructions, which when executed by an apparatus, further cause the apparatus at least to:

determine one or more constituents that are removable in one or more phrase specifications based at least in part on the at least one domain rule; and remove the one or more constituents that are removable, such that the one or more phrase specifications are one or more generalized phrase specifications.

24. A computer program product according to claim 21 further comprises program code instructions, which when executed by an apparatus, further cause the apparatus at least to:

determine one or more constituents that are generalizable in one or more phrase specifications;

determine a generalized constituent for at least one of the one or more generalizable constituents based at least in part on the at least one domain rule; and replace the one or more generalized constituents with the determined generalized constituent, such that the one or more phrase specifications are one or more generalized phrase specifications.

25. A computer program product according to claim 24, wherein the generalized constituent is a most generalized constituent in a predefined constituent listing.

26. A computer program product according to claim 23 further comprises program code instructions, which when executed by an apparatus, further cause the apparatus at least to:

remove all of the one or more constituents from the one or more phrase specifications that are removable; and replace all of the one or more generalizable constituents from the one or more phrase specifications with the determined generalized constituent, such that the one or more phrase specifications are one or more generalized phrase specifications.

27. A computer program product according to claim 21, wherein the two or more generalized phrase specifications are identified as aggregatable in an instance in which each of the two or more generalized phrase specifications are identical but for the at least one aggregatable constituent in each of the two or more generalized phrase specifications.

28. A computer program product according to claim 21 further comprises program code instructions, which when executed by an apparatus, further cause the apparatus at least to:

generate the combined noun phrase using the at least one aggregatable constituent in the two or more generalized phrase specifications.

29. A computer program product according to claim 21 further comprises program code instructions, which when executed by an apparatus, further cause the apparatus at least to:

determine that the two or more generalized phrase specifications are still identified as aggregatable with a constituent that is removed; and populate the aggregated phrase specification with at least one of a generalized constituent or a removed constituent.

30. A computer program product according any to claim 21 further comprises program code instructions, which when executed by an apparatus, further cause the apparatus at least to:

determine that the two or more generalized phrase specifications are still identified as aggregatable with a constituent that is less generalized than a generalized constituent; and populate the aggregated phrase specification with the constituent that is less generalized than the generalized constituent based on a predefined constituent listing.

* * * * *